US009454745B2

(12) United States Patent
Howard

(10) Patent No.: US 9,454,745 B2
(45) Date of Patent: Sep. 27, 2016

(54) SYSTEM AND METHOD OF TRACKING VEHICLES WITHIN A PARKING LOT USING RFID TAGS

(71) Applicant: Barry Howard, Fairmount, IN (US)

(72) Inventor: Barry Howard, Fairmount, IN (US)

(73) Assignee: ALLI SOLUTIONS, INC., Fairmount, IN (US)

( * ) Notice: Subject to any disclaimer, the term of this patent is extended or adjusted under 35 U.S.C. 154(b) by 84 days.

(21) Appl. No.: 14/045,115

(22) Filed: Oct. 3, 2013

(65) Prior Publication Data

US 2014/0028447 A1    Jan. 30, 2014

Related U.S. Application Data

(63) Continuation-in-part of application No. 12/487,397, filed on Jun. 18, 2009, now Pat. No. 8,604,912.

(60) Provisional application No. 61/138,463, filed on Dec. 17, 2008.

(51) Int. Cl.
| | | |
|---|---|---|
| *H04Q 5/22* | (2006.01) | |
| *G06Q 10/08* | (2012.01) | |
| *G06F 17/30* | (2006.01) | |

(52) U.S. Cl.
CPC ............ *G06Q 10/087* (2013.01); *G06F 17/30* (2013.01); *G06F 17/30241* (2013.01); *H04Q 2213/13095* (2013.01)

(58) Field of Classification Search
CPC ........... G06K 7/0008; G06K 19/0723; G06Q 10/087; G06Q 30/02; G01B 7/004
USPC ............. 340/10.6, 10.3, 933, 937, 901, 988, 340/505, 989, 990, 995.18
See application file for complete search history.

(56) References Cited

U.S. PATENT DOCUMENTS

| | | | |
|---|---|---|---|
| 6,104,333 A | 8/2000 | Wood, Jr. | |
| 6,121,926 A | 9/2000 | Belcher et al. | |
| 6,496,806 B1 | 12/2002 | Horwitz et al. | |
| 6,600,418 B2 | 7/2003 | Francis | |
| 6,687,609 B2 * | 2/2004 | Hsiao ....................... | G08G 1/20 340/993 |
| 7,046,141 B2 | 5/2006 | Pucci et al. | |
| 7,082,344 B2 * | 7/2006 | Ghaffari ................ | G05B 19/00 235/385 |
| 7,121,457 B2 | 10/2006 | Michal, III | |
| 7,236,851 B2 | 6/2007 | Charych | |
| 7,675,412 B2 * | 3/2010 | Adra ..................... | G01S 5/0294 235/375 |
| 8,014,540 B2 | 9/2011 | Riggs | |

(Continued)

Primary Examiner — George Bugg
Assistant Examiner — Anthony S Afrifa-Kyei
(74) Attorney, Agent, or Firm — Matthew G. McKinney, Esq.; Allen, Dyer, Doppelt, Milbrath & Gilchrist, P.A.

(57) ABSTRACT

A system and method of tracking vehicles stored within a parking lot using RFID tags is disclosed. The method includes creating a record of a vehicle, where the record includes information associated with the vehicle. The method further includes assigning an RFID tag to the record associated with the vehicle, attaching the RFID tag to the vehicle, detecting the RFID tag using a first interrogator, and determining a new geographic location of the first interrogator contemporaneously with detecting the RFID tag. In addition, the method may include recording video of the vehicle, where the video includes a video record of each time when the vehicle is moved. The method includes assigning the new geographic location of the RFID tag when the RFID tag is no longer detected by the first interrogator and updating the record with the new geographic location of the RFID tag and the vehicle.

20 Claims, 7 Drawing Sheets

(56) References Cited

U.S. PATENT DOCUMENTS

| | | | |
|---|---|---|---|
| 2004/0177032 A1* | 9/2004 | Bradley | G06K 17/00 705/38 |
| 2004/0254840 A1* | 12/2004 | Slemmer | G06Q 10/02 705/22 |
| 2006/0229928 A1 | 10/2006 | Nix | |
| 2007/0171069 A1 | 7/2007 | Allen | |
| 2007/0252696 A1* | 11/2007 | Belisle | B60R 25/102 340/572.1 |
| 2009/0219170 A1 | 9/2009 | Clark et al. | |
| 2010/0296908 A1 | 11/2010 | Ko | |

\* cited by examiner

SYSTEM AND METHOD OF TRACKING VEHICLES WITHIN A PARKING LOT USING RFID TAGS

CROSS REFERENCE TO RELATED APPLICATIONS

The present application is a continuation-in-part of U.S. patent application Ser. No. 12/487,397, filed Jun. 18, 2009, which claims the benefit of U.S. Provisional Application No. 61/138,463, filed Dec. 12, 2008.

FIELD OF THE DISCLOSURE

The present disclosure is generally related to a system and method of tracking vehicles within a parking lot using RFID tags.

BACKGROUND

Various radio-frequency identification ("RFID") tag devices have been used in tracking systems in the past and are currently in use. A typical system includes an RFID tag that provides non-volatile memory for storing information and a means well known in the art for interacting with an interrogator (or reader). The RFID tags may contain identifier information associated with the particular objects to be tracked and are attached to the objects.

The RFID interrogator is used to detect the presence of an RFID tag and to read the information stored on the RFID tag. A typical RFID interrogator includes an RF transceiver for transmitting interrogation signals to the RFID tag and receiving response signals from RFID tags. The interrogator also includes one or more antennae connected to the transceiver and associated decoders and encoders for reading and writing the encoded information in the received and transmitted RF signals, respectively. After detecting a RFID tag attached to an object, an information processing unit associated with the interrogator determines that the object is present, and updates a database accordingly.

In addition, a global positioning system ("GPS") may be integrated into the system to identify a geographic location of the RFID tag when detected. The geographic location may also be stored in the database. However, the prior art RFID systems do not have the ability to backfeed the geographic location information to an existing inventory management system by correlating x-y boundaries to a row-slot storage numbering system within a parking lot often used in the vehicle industry.

It is, therefore, to the effective resolution of the aforementioned problems and shortcomings of the prior art that the present invention is directed.

SUMMARY

In a particular embodiment, a method of tracking vehicles within a parking lot using RFID tags is disclosed. The method includes creating a record of a vehicle, where the record includes information associated with the vehicle. The method further includes assigning an RFID tag to the record associated with the vehicle, attaching the RFID tag to the vehicle, detecting the RFID tag using a first interrogator, and determining a new geographic location of the first interrogator contemporaneously with detecting the RFID tag. In addition, the method may include recording video of the vehicle, where the video includes a video record of each time when the vehicle is moved. The method includes assigning the new geographic location of the RFID tag when the RFID tag is no longer detected by the first interrogator and updating the record with the new geographic location of the RFID tag.

In another particular embodiment, the method includes backfeeding the new geographic location to an existing inventory management system and correlating the new geographic location to a row-slot storage numbering system. The method may further include detecting the RFID tag with a second interrogator, where a current geographic location of the second interrogator is determined contemporaneously with detecting the RFID tag. In addition, the method includes assigning the current geographic location of the second interrogator to the RFID tag when the second interrogator no longer detects the RFID tag, comparing the current geographic location of the RFID tag to the stored geographic location for the RFID tag, and updating the record associated with the RFID tag with the current geographic location when the current geographic location does not match the stored geographic location for the RFID tag within a pre-determined tolerance.

In another particular embodiment, a system of tracking vehicles within a parking lot using RFID tags is disclosed. The system includes an RFID tag attached to a vehicle, a database to store data associated with the RFID tag, where the RFID tag is associated with the vehicle, a first interrogator secured to a first mobile platform to detect an identity of the RFID tag, a navigation system in communication with the first interrogator, where the navigation system determines a current geographic location of the first mobile platform, a signal transmitted to the database, where the signal includes the identity of the RFID tag and the current geographic location of the first mobile platform and the vehicle. The first mobile platform may have more than one interrogator, which may be placed anywhere, for example, on the left side, right side, or any combination thereof. The interrogators each include an antenna that emits radio waves and the RFID tag responds by sending back its data. The database may record the current geographic location of the vehicle associated with the RFID tag when the first interrogator no longer detects the RFID tag (i.e., moves out of range). The system further includes a graphical user interface ("GUI"), where the GUI accesses the database and references the data associated with the RFID tag and the vehicle and the GUI displays the last recorded geographic location of the vehicle. In addition, the system includes a second mobile platform, where a second interrogator is mounted to the second mobile platform. Similar to the first mobile platform, the second mobile platform may have interrogators placed anywhere, for example, on the left side, right side, or any combination thereof.

The database may include historical information of the movements of the first mobile platform. The system may also include a video camera mounted to the first mobile platform to record video images of the vehicle. Further, the system may include a second signal to transmit to the database, where the second signal includes the identity of the RFID tag and the current geographic location of the second mobile platform and the vehicle when the second interrogator no longer detects the RFID tag. The last recorded geographic location of the vehicle and the current geographic location of the vehicle may be averaged to determine a more accurate geographic location of the vehicle when the vehicle has otherwise not moved. The system may include a global positioning system to determine a current geographic location of the first mobile platform and a compass directional finder, where the compass directional finder displays a relative position and distance of the vehicle from the first mobile platform.

Other aspects, advantages, and features of the present disclosure will become apparent after review of the entire application, including the following sections: Brief Description of the Drawings, Detailed Description, and the Claims.

DETAILED DESCRIPTION

Figure 1:
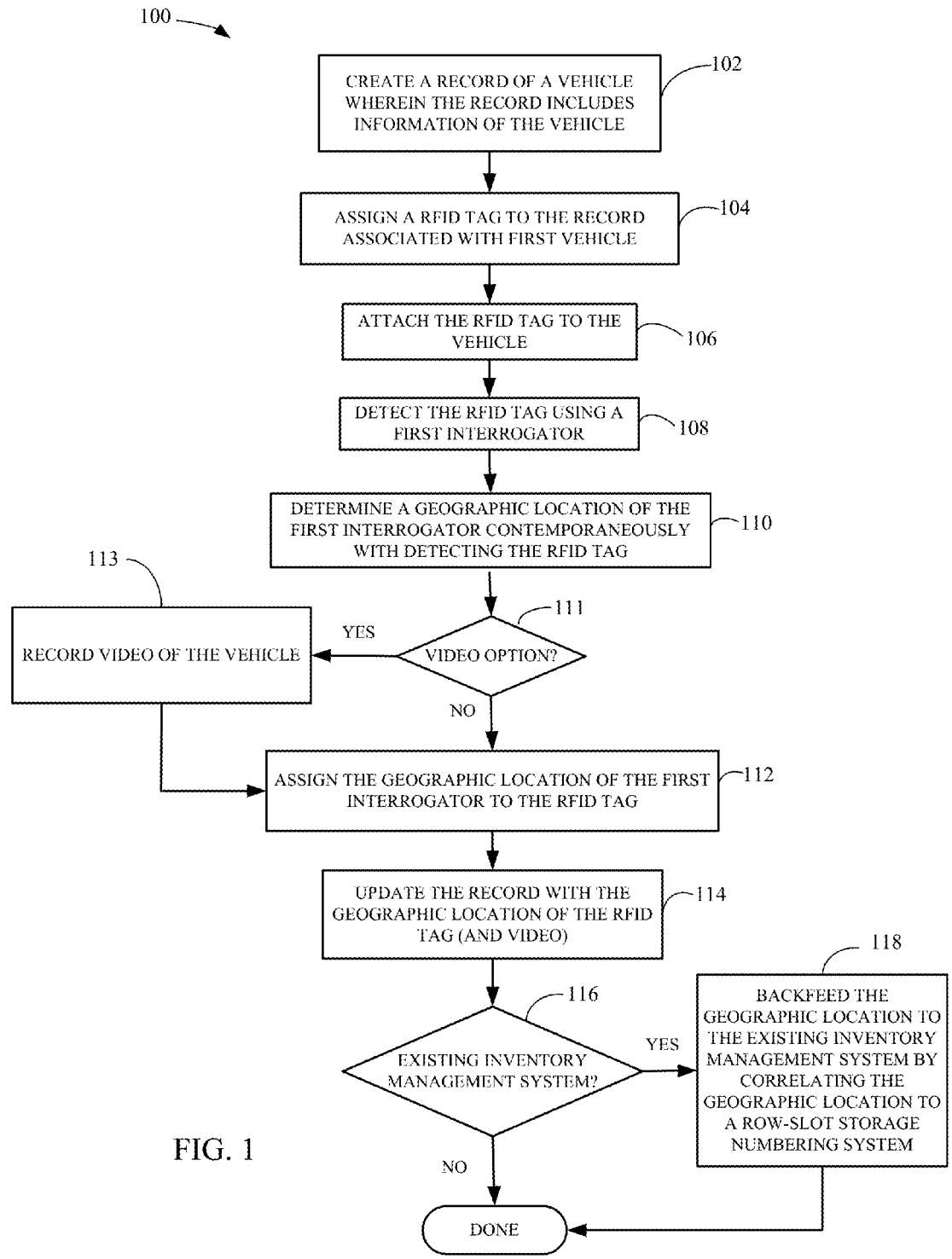
FIG. 1 is a flow diagram of a particular illustrative embodiment of a method of tracking vehicles within a parking lot using RFID tags.

The invention is related to locating and tracking vehicles within a parking lot through the use of RFID tags. An RFID tag is attached to a vehicle before it enters a facility such as a parking lot for an auction or car dealership, for example. A computer system is used to store identification data associated with the RFID tag in a database, where the identification data is correlated with various other pertinent information related to the vehicle. A first mobile platform, such as a golf cart, includes an RFID interrogator that automatically reads the RFID tag, within a pre-determined range, when vehicles are moving to a designated location within the parking lot. When the RFID interrogator detects an RFID tag within the parking lot, a wireless signal is transmitted to the computer system receiver indicating that the vehicle associated with that particular RFID tag has been detected. The first mobile platform includes a GPS navigation system that allows the computer system to track the location of the mobile platform as it continues to detect the RFID tag. When the RFID interrogator no longer detects the RFID signal, then the computer system records the new location of the vehicle associated with that particular RFID tag to the database.

In operation, when a user desires to find a particular vehicle, the vehicle is queried by the computer system, which then accesses the database and references the RFID tag associated with the vehicle and displays the last known location of the vehicle within the facility.

In addition, the system automatically verifies and updates periodically the stored location of the vehicle. This feature may be required for vehicles that have been moved under their own power or other means without having an RFID interrogator in communication with the computer system at the time of the move or otherwise out of range. The verification and updating may be accomplished with the RFID interrogator mounted to the first mobile platform detecting the RFID tag or a second RFID interrogator mounted to second mobile platform such as another golf cart, utility vehicle, etc. that detects RFID tags while traveling throughout the parking lot or facility. The second mobile platform also includes a GPS navigation system similar to the first mobile platform. In addition, the system may record movements of the vehicle and the mobile platforms and store the data in the database. The mobile platforms may have interrogators placed anywhere, for example, on the left side, right side, or any combination thereof. The interrogators each include an antenna that emits radio waves and the RFID tag responds by sending back its data. The data includes separate historical information as to the movement of the platforms and assists in managing subsequent damage analysis (e.g., intrasite damage). In addition, the system and method may include the ability of capturing live and recorded video images of the vehicle being transported by a permanently mounted camera on the mobile platform. This is used to monitor for vehicle damage. Further, the system has the capability of backfeeding location information to a company's existing inventory-management system by correlating x-y boundaries to a customer's row-slot storage numbering system.

The system includes the feature of detecting RFID tags of vehicles that have already been placed and sitting statically using a second scan. An advantage of the second scan is to verify that the previous scan was correct in recording the location of the vehicle. Further, this ensures that vehicles that may have been moved have had their new locations updated with the updated location coordinates.

The second scan may be accomplished with the same first mobile platform capturing the initial placement location, or can be mounted to second mobile platform (golf cart, utility vehicle, etc.) that randomly scans while traveling throughout the parking lot or facility. In addition, multiple reads (or scans) may be made of the RFID tags in a few seconds as the RFID tag comes within range. A weighted average of the multiple reads of a particular RFID tag has the effect of providing a more precise location of the vehicle.

Referring to FIG. 1, a particular illustrative embodiment of a method of tracking vehicles within a parking lot using RFID tags is disclosed and generally designated 100. A record of a vehicle is created, at 102, wherein the record includes information of the vehicle. Continuing to 104, a RFID tag is assigned to the record associated with the vehicle. Moving to 106, the RFID tag is attached to the vehicle. The RFID tag is detected using a first interrogator, at 108. A geographic location of the first interrogator, at 110, is contemporaneously determined with detecting the RFID tag. If a video option is selected, at 111, the method may include recording video of the vehicle, at 113. The video may be used for evaluation of damaged vehicles by providing the ability to view historical images of the vehicles recorded by the mobile platform. In addition, the video may be indexed and sorted to view video of any particular vehicle's events. Subsequently at 112, the geographic location of the first interrogator is assigned to the RFID tag. The record is then updated, at 114, with the geographic location of the RFID tag (and video). If there is an existing inventory management system, at 116, then backfeeding the geographic location to the existing inventory management system is completed by correlating the geographic location to a row-slot storage numbering system, at 118.

Figure 2:
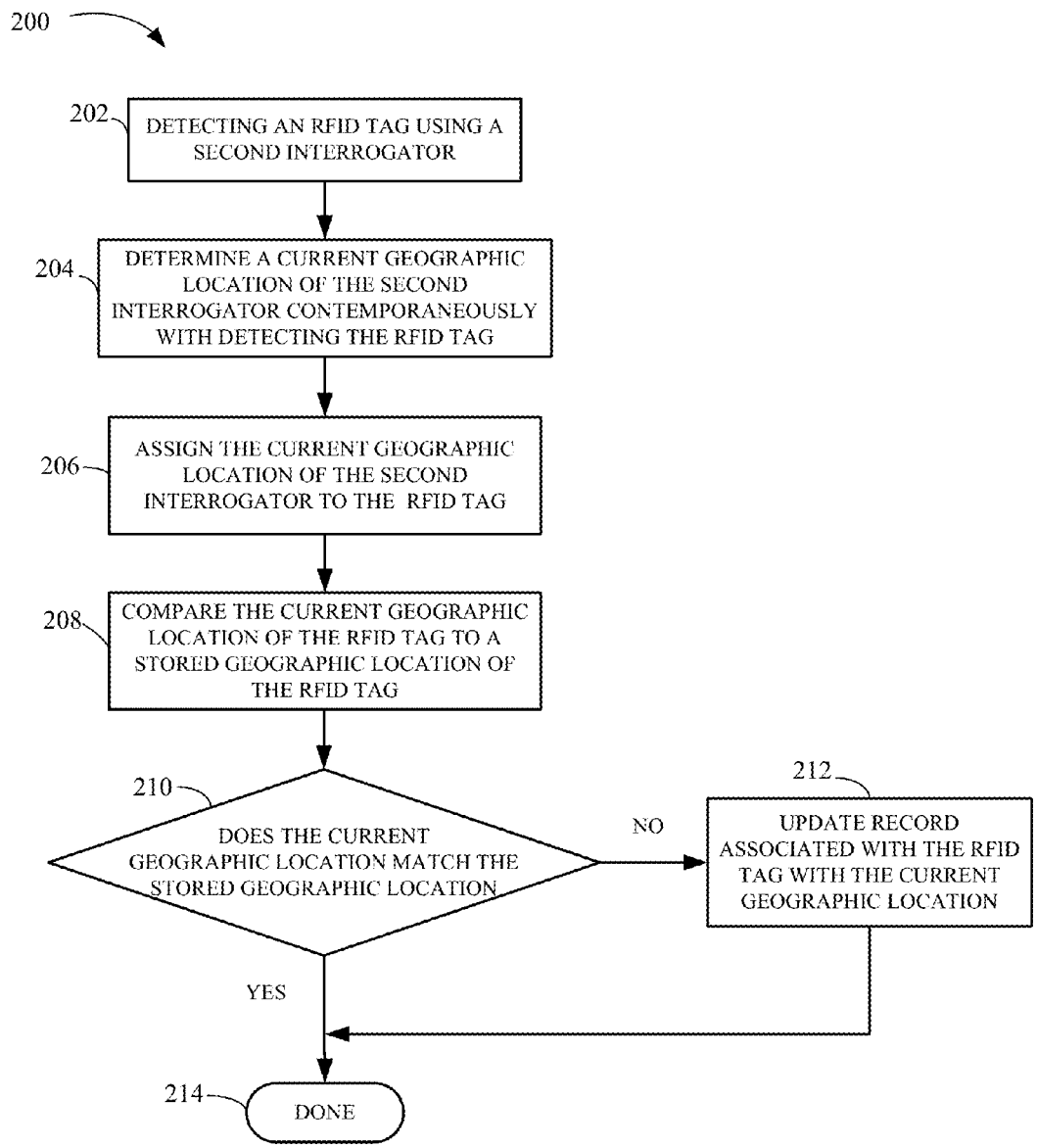
FIG. 2 is a flow diagram of a particular illustrative embodiment of a method of updating a record associated with a RFID tag.

A particular illustrative embodiment of a method of confirming the location of the vehicle is illustrated in FIG. 2 and generally designated 200. At 202, an RFID tag is detected using a second interrogator. Once the RFID tag is detected, a current geographic location of the second interrogator within the parking lot is determined contemporaneously with detecting the RFID tag, at 204. Continuing to 206, the current geographic location of the second interrogator is assigned to the RFID tag. The current geographic location of the RFID tag is compared, at 208, to the stored geographic location of the RFID tag. If the current geographic location does not match the stored geographic location for the RFID tag, at 210, then the record associated with the RFID tag is updated with the current geographic location, at 212.

Figure 3:
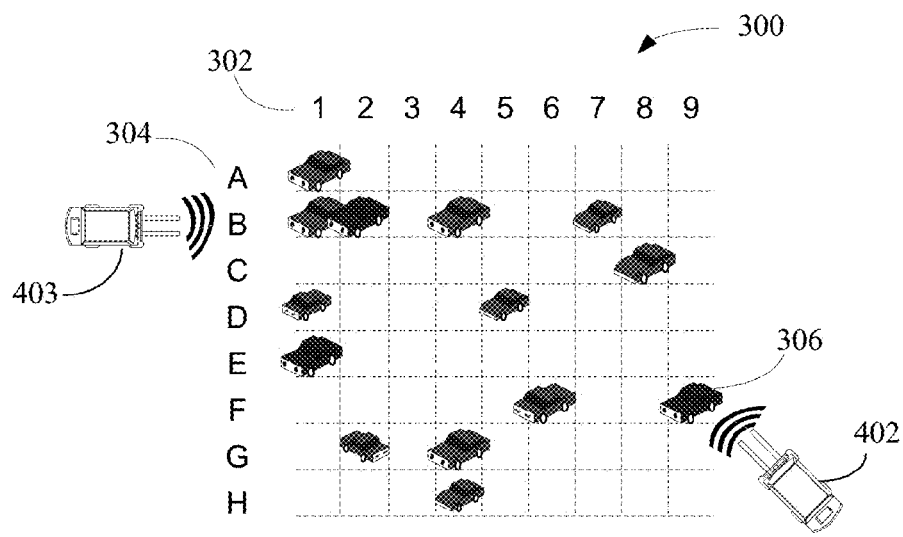
FIG. 3 is a diagram of a particular illustrative embodiment of a row-slot storage system in accordance with the method of FIG. 1.

A diagram that illustrates the row-slot storage system is disclosed in FIG. 3 and generally designated as 300. The slots 302 are designated as the numbers 1-9 as an example. The rows 304 are designated as the letters A-H, as an example. Accordingly, the row-slot location of vehicle 306 is then identified as row F, slot 9. An interrogator may be mounted to a first mobile platform 402, golf cart or other similar type of equipment. A second interrogator may be mounted to a second mobile platform (e.g., golf cart) 403 to operate around the parking lot detecting RFID tags and moving vehicles. Any number of interrogators and mobile platforms may be used with the method and system of tracking vehicles within a parking lot using RFID tags.

Figure 4:
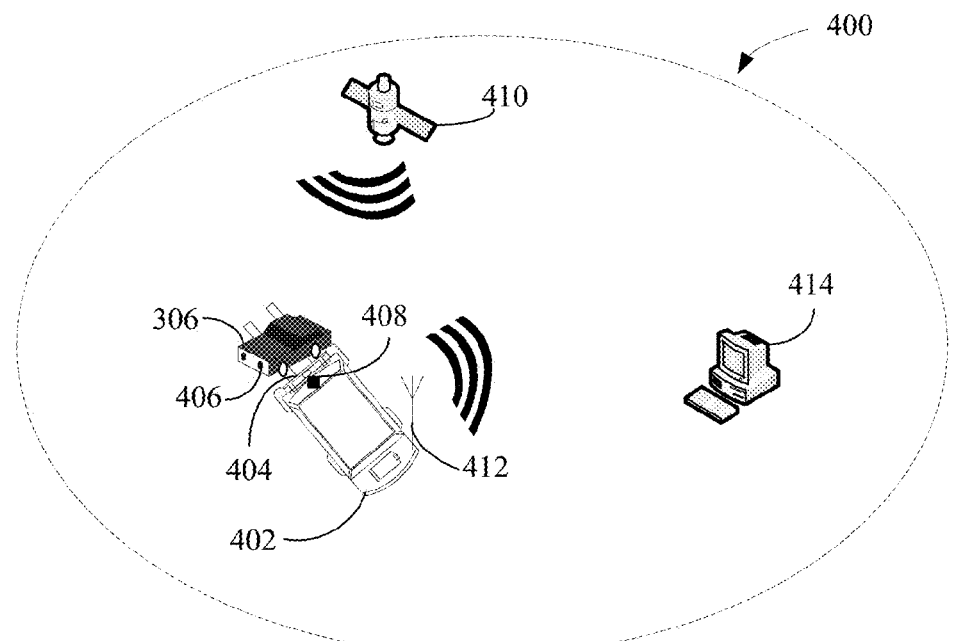
FIG. 4 is a diagram of a particular illustrative embodiment of system of tracking vehicles within a parking lot using RFID tags.
Figure 5:
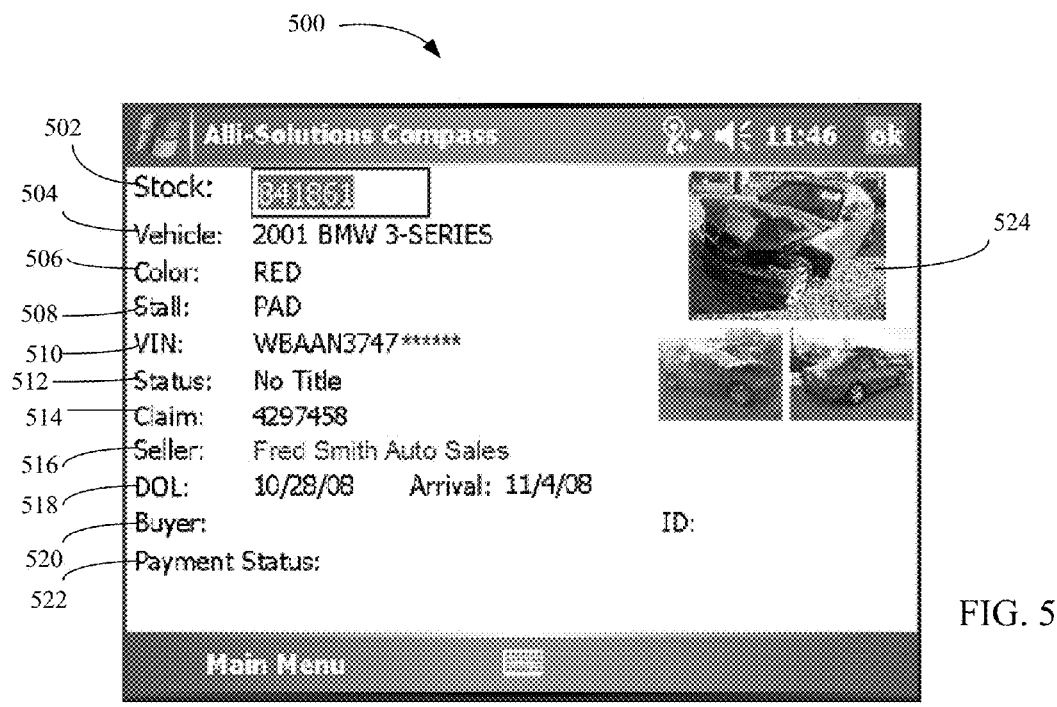
FIG. 5 is a representation of a GUI display showing a record of a first vehicle in accordance with the method of FIG. 1.
Figure 6:
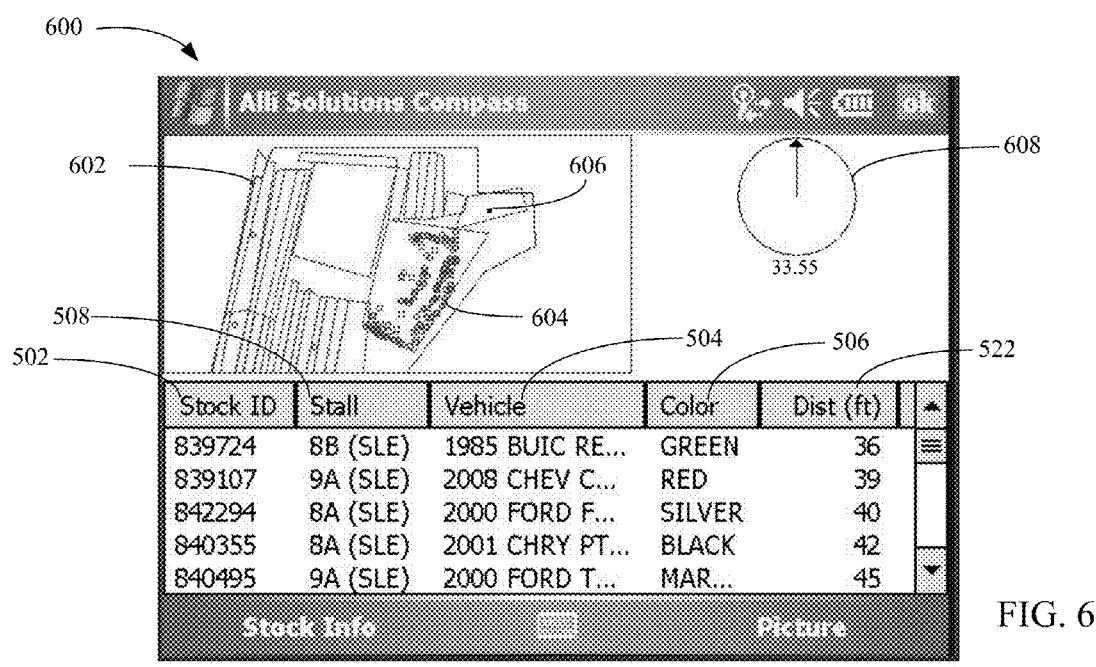
FIG. 6 is a representation of a GUI display showing a graphical display of a lot indicating locations of vehicles on the lot.

Referring now to FIG. 4, a system of tracking salvage vehicles and parts is disclosed and generally designated 400. As an example, a golf cart 402 includes an interrogator 404 that is used to detect RFID tags. The interrogator 404 may detect (or read) an RFID within a pre-determined range. Multiple reads may be made of the RFID tags in a few seconds as the RFID tag comes within the pre-determined range. A weighted average of the multiple reads of a particular RFID tag has the effect of providing a more precise location of the vehicle.

The RFID tag 406 may be located at the front of the vehicle 306 or any desirable location. In addition, a global positioning system ("GPS") 408 may be mounted to the golf cart 402 and in communication with satellites 410. A transmitter 412 mounted to the golf cart 402 transmits data regarding a detected RFID tag to a receiver and database 414. The transmitter 412 may also be used to transmit video of the vehicle 306 associated with the RFID tag 406.

A graphical user interface ("GUI") 500, may be used to enter information to create the record 102 of a first vehicle of the method of FIG. 1. For example, the record may include information of the stock number 502, vehicle make and model 504, color 506, location 508, VIN 510, status 512, claim number 514, seller 516, date of delivery and arrival 518, buyer name 520, payment status 522 and pictures of the vehicle 524, or any combination thereof. Once the data has been entered and the record created using the GUI 500, the system may be used to track the vehicle throughout the parking lot or facility by periodically receiving data from the transceiver 412.

Figure 7:
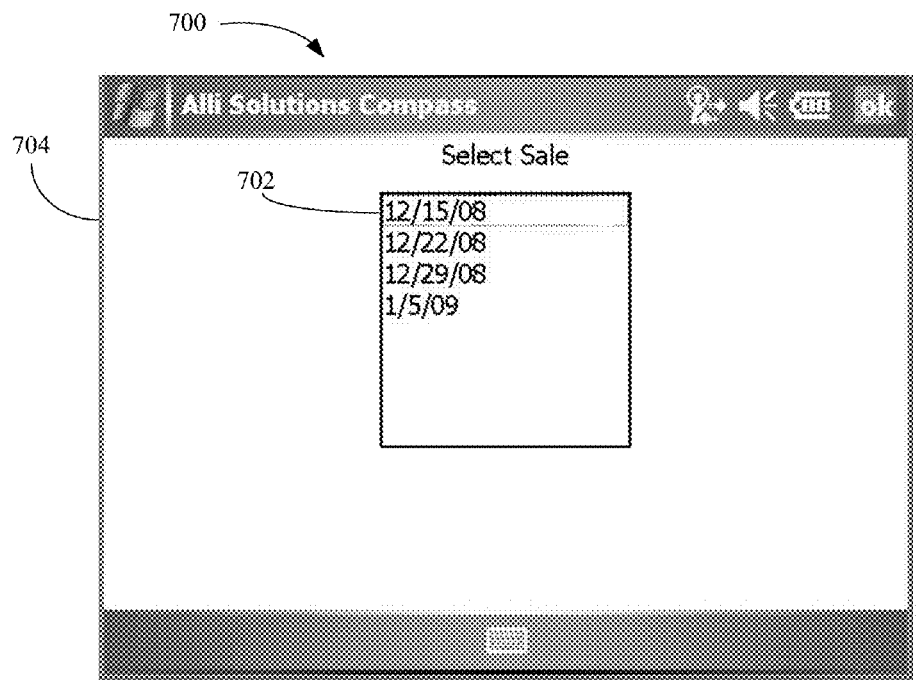
FIG. 7 is a representation of a GUI display used to select an auction sale in accordance with the method of FIG. 1.

A graphical display 600 indicates the geographic zones 602 (i.e., row-slot storage system shown in FIG. 3) that are back-fed to the auction inventory management system in a traditional storage-location format. In this particular illustrative embodiment, the locations of the vehicles 604 associated with a selected auction sale are shown with a hollow square box symbol. The golf cart's location 606 is indicated by a solid square box symbol. A compass directional finder 608 points in a relative position of the golf cart to the vehicle selected and the straight line distance (e.g., 33.55 feet). The lower half of the display 600 is a textual list of vehicles for auction sale, sortable by any field 502, 504, 506, 508, 522. The list of vehicles is generated by the user selecting the auction sale 702 using a GUI 704, as shown in FIG. 7.

Figure 8:
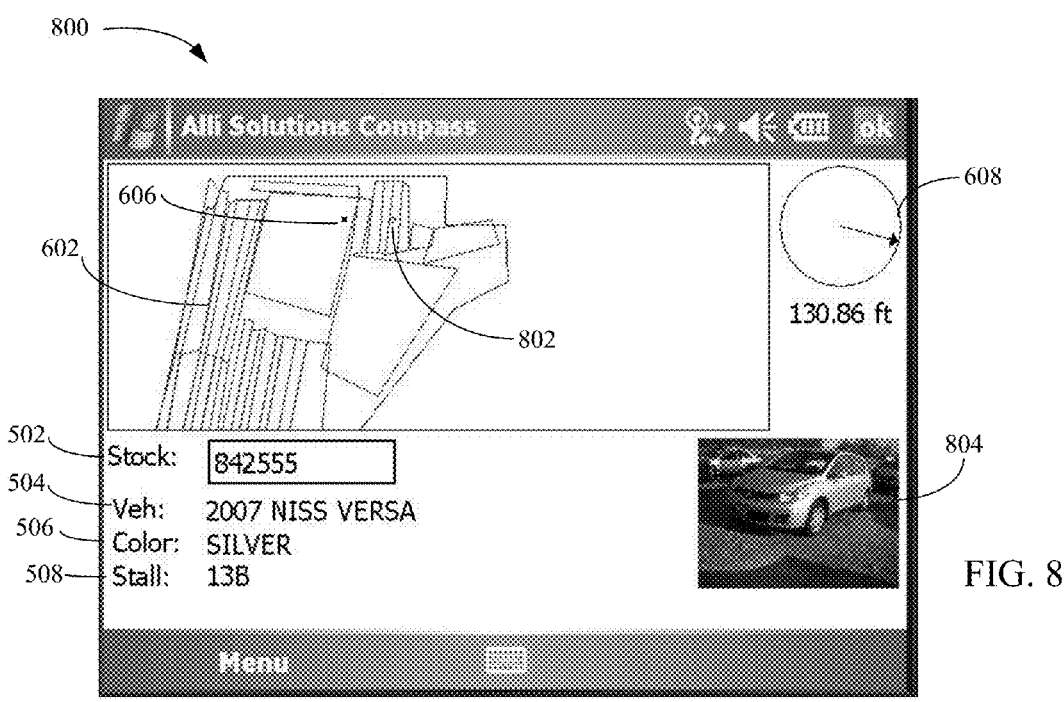
FIG. 8 is a representation of a GUI display used to locate a selected vehicle on the lot in accordance with the method of FIG. 1.

Referring now to FIG. 8, once a vehicle is selected, for example by entering an inventory stock number 502, the location of the selected vehicle 802 is displayed on GUI 800. The golf cart's location 606 is shown in real-time. The compass directional finder 608 shows the relative position and distance of the selected vehicle 802 from the golf cart 606. Recorded video 804 or photographs of the selected vehicle may be displayed for identification purposes, for evaluation of any damage, or to view any events associated with the vehicle.

Figure 9:
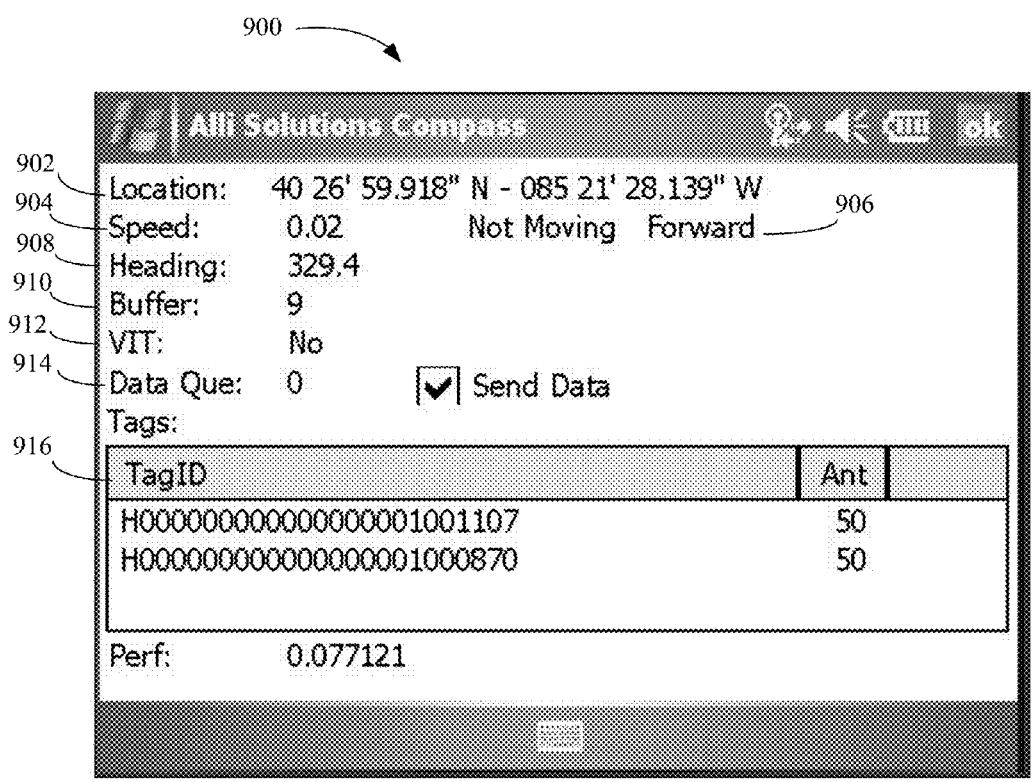
FIG. 9 is a representation of a GUI display showing data related to the location of the interrogator and RFID tags in accordance with the method of FIG. 1.

FIG. 9 shows data related to the GPS location 902 of the interrogator. In addition, the speed 904 and heading 908 may be indicated. Various internal data management values such as buffer 910, VIT 912, data queue 914, etc., may also be displayed. The identification of various RFID tags is shown in the display 900, which corresponds to a particular vehicle.

Figure 10:
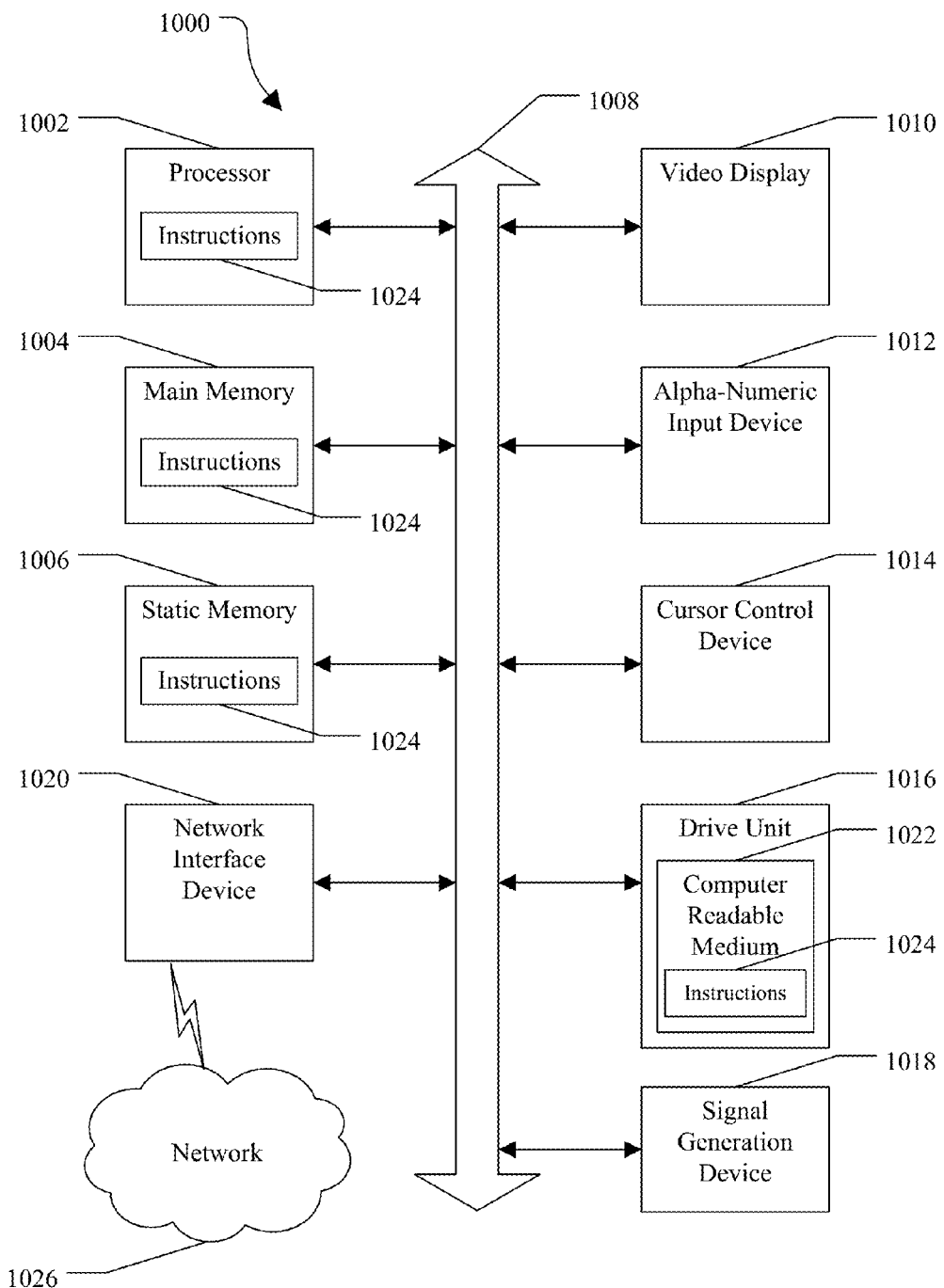
FIG. 10 is a block diagram of an illustrative embodiment of a general computer system.

As illustrated in FIG. 10, the computer system 1000 may include a processor 1002, e.g., a central processing unit (CPU), a graphics-processing unit (GPU), or both. Moreover, the computer system 1000 can include a main memory 1004 and a static memory 1006 that can communicate with each other via a bus 1008. As shown, the computer system 1000 may further include a video display unit 1010, such as a liquid crystal display (LCD), a flat panel display, a solid-state display, or a cathode ray tube (CRT). Additionally, the computer system 1000 may include an input device 1012, such as a keyboard, and a cursor control device 1014, such as a mouse. The computer system 1000 can also include a disk drive unit 1016, a signal generation device 1018, such as a speaker or remote control, and a network interface device 1020.

In a particular embodiment, as depicted in FIG. 10, the disk drive unit 1016 may include a computer-readable medium 1022 in which one or more sets of instructions 1024, e.g. software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined herein.

What is claimed is:

1. A method of tracking vehicles within a parking lot using RFID tags, the method comprising:
    creating a record of a vehicle, wherein the record is stored on a computer and includes information associated with the vehicle;
    creating a electronic map of the parking lot relative to a global positioning system (GPS) to store on the computer, the electronic map representing a plurality of slots with each slot representing a parking spot to park a respective vehicle in the parking lot;
    assigning a RFID tag to the record associated with the vehicle using the computer;
    detecting the RFID tag attached to the vehicle stored in a parking lot within a pre-determined range using a mobile first interrogator when the vehicle is stationary;
    determining a new GPS location of the mobile first interrogator within the parking lot upon detecting the RFID tag by the first interrogator;
    associating the new GPS location with a particular slot of the parking lot using the electronic map;
    and assigning the particular slot to the vehicle in response to RFID tag is no longer detected by the first interrogator to indicate a current parking spot of the vehicle within the parking lot.

2. The method of claim 1, further comprising recording video of the vehicle, wherein the video includes a video record of each time when the vehicle is moved.

3. The method of claim 2, further comprising indexing and sorting the video record.

4. The method of claim 1, wherein the parking lot is for an auto auction or for car sales.

5. The method of claim 4, further comprising updating the record with the new geographic location of the RFID tag.

6. The method of claim 5, further comprising updating the record with a video record of the vehicle.

7. The method of claim 6, further comprising backfeeding the new geographic location to an existing inventory management system.

8. The method of claim 6, further comprising detecting the RFID tag with a second interrogator, wherein a current geographic location of the second interrogator is determined contemporaneously with detecting the RFID tag.

9. The method of claim 8, further comprising assigning the current geographic location of the second interrogator to the RFID tag when the second interrogator no longer detects the RFID tag.

10. The method of claim 9, further comprising:
    comparing the current geographic location of the RFID tag to a stored geographic location for the RFID tag; and
    updating the record associated with the RFID tag with the current geographic location when the current geographic location does not match the stored geographic location for the RFID tag within a pre-determined tolerance.

11. A system of tracking vehicles within a parking lot using RFID tags, the system comprising:
    a RFID tag attached to a vehicle; a database to store data associated with the RFID tag, wherein the RFID tag is associated with the vehicle stored in the parking lot;
        an electronic map of the parking lot relative to a global positioning system (GPS) being stored in the database, the electronic map representing a plurality of slots with each slot representing a parking spot to park a respective vehicle in the parking lot;
        a first interrogator secured to a first mobile platform to detect an identity of the RFID tag when the vehicle is stationary;
        a navigation system in communication with the first interrogator, wherein the navigation system takes at least one reading of a location of the first mobile platform within the parking lot when the RFID tag is detected and determines a current GPS location of the first mobile platform;
        a processor configured to associate the current GPS location with a particular slot of the parking lot using the electronic map;
        the processor further configured to assign the particular slot to the vehicle in response to the RFID tag is no longer detected by the first interrogator to indicate a current parking spot of the vehicle within the parking lot; and
        a signal transmitted to the database, wherein the signal includes the identity of the RFID tag and the current location of the vehicle within the parking lot.

12. The system of claim 11, wherein the parking lot is for an auto auction or car sales.

13. The system of claim 11, further comprising a graphical user interface ("GUI"), wherein the GUI accesses the database and references the data associated with the RFID tag and the vehicle, and the GUI displays a last recorded geographic location of the vehicle.

14. The system of claim 13, wherein the first mobile platform is a golf cart.

15. The system of claim 11, further comprising a second mobile platform, wherein a second interrogator is mounted to the second mobile platform.

16. The system of claim 11, wherein the database further comprising historical information of movements of the first mobile platform.

17. The system of claim 11, further comprising a video camera mounted to the first mobile platform to record video images of the vehicle.

18. The system of claim 15, further comprising a second signal transmitted to the database, wherein the second signal includes the identity of the RFID tag and the current location of the second mobile platform and the current location of the vehicle within the parking lot when the second interrogator no longer detects the RFID tag.

19. The system of claim 11, wherein a last recorded geographic location of the vehicle and the current geographic location of the vehicle are compared to determine the vehicle has moved.

20. A system of tracking vehicles within a parking lot using RFID tags, the system comprising:
a RFID tag attached to a vehicle;
a database;
an electronic map of the parking lot relative to a global positioning system (GPS) stored in the database, the electronic map representing a plurality of slots with each slot representing a parking spot to park a respective vehicle in the parking lot;
a RFID interrogator secured to a first mobile platform to detect an identity of the RFID tag within a pre\-determined range from the interrogator;
a GPS device to take at least one reading of a current GPS location of the first mobile platform when the RFID tag is detected within the parking lot;
a processor configured to associate the current GPS location with a particular slot of the parking lot using the electronic map;
the processor further configured to assign the particular slot to the vehicle in response to the RFID tag is no longer detected by the first interrogator to indicate a current parking spot of the vehicle within the parking; and
a compass directional finder, wherein the compass directional finder being configured to display a relative position and distance of the vehicle from the first mobile platform within the parking lot when the vehicle is stationary.

* * * * *